June 20, 1933.  W. E. WAGNER  1,915,077

PROCESS AND APPARATUS FOR OXIDIZING AMMONIA

Filed May 11, 1929

Inventor:
WILLIAM E. WAGNER,
By John H. Bruninga
His Attorney.

Patented June 20, 1933

1,915,077

UNITED STATES PATENT OFFICE

WILLIAM E. WAGNER, OF ALTON, ILLINOIS

PROCESS AND APPARATUS FOR OXIDIZING AMMONIA

Application filed May 11, 1929. Serial No. 362,412.

This invention relates to the oxidation of ammonia in order to form oxides of nitrogen or nitric acid.

In the oxidation of ammonia, a mixture of ammonia and air is contacted with a catalyzer which generally consists of a fine platinium screen. The reaction which takes place may be represented thus:

$$4NH_3 + 5O_2 = 4NO + 6H_2O.$$

In the first attempts to oxidize ammonia for commercial manufacture of nitric acid a catalyst temperature of 300° C. was employed. It was soon realized that better results could be accomplished and higher yields of nitric oxide attained by increasing the temperature of the catalyst. It is known, however, that nitric oxide is not stable above 1200° C., and in fact decomposes at a measurable rate at 670° C. Below 620° C., however, nitric oxide takes on more oxygen to form nitrogen tetroxide ($NO_2$) and when the temperature is reduced to 140° C. all the NO is converted into $NO_2$. As the temperature approaches 150° C. some of the $NO_2$ is converted into $N_2O_4$, at 64° C. about half has been converted and at 20° C. the conversion to $N_2O_4$ is substantially complete. $N_2O_4$ combines with water in the absorption towers of a nitric acid plant to yield nitric acid ($HNO_3$) as follows:

$$N_2O_4 + H_2O = HNO_3 + HNO_2$$
$$3HNO_2 = HNO_3 + 2NO + H_2O$$
$$2NO + O_2 = N_2O_4$$

When ammonia is being oxidized to produce nitric oxide, some ammonia inevitably dissociates producing free surplus nitrogen and water. This free nitrogen is, however, not of use to form nitric acid in the absorption towers but passes out into the atmosphere as surplus free nitrogen and it is therefore desirable to so control the process that the dissociation of ammonia and consequent yield of free nitrogen is minimized.

Raising the temperature of the catalyst permits a greater volume of the mixture to be contacted since the gases may travel at a higher velocity through the catalyst. As the temperature of the catalyst is increased the yield of nitric oxide increases more rapidly than the yield of free nitrogen from dissociation of ammonia. It is very desirable from this standpoint, therefore, that the process be carried out at a high catalyst temperature, especially since the catalyst, being generally of a platinum screen and very expensive, is thus enabled to deliver a greater output per unit area. Notwithstanding these advantages, high operating temperature for the catalyst meets with the very serious fault of causing decomposition of the nitric acid which, as above referred to, releases free nitrogen and thus contaminates the system and reduces the efficiency. It is an object of the present invention, generally stated, to provide a process of oxidizing ammonia, which is particularly useful in the manufacture of nitric acid, and in which advantage may be taken of the desirable features of high catalyzer temperatures and at the same time avoid the deleterious effects of such high temperatures.

The efficiency of an ammonia oxidizing process is, however, increased by preheating the mixture before contact with the catalyzer takes place. This can be conveniently accomplished by utilizing the heat of reaction, which is exothermic. It has, therefore, been proposed to pass the mixture outwardly through a cylindrical catalyzing screen which is surrounded by a heat absorbing and reflecting wall of refractory material. This, however, results in part of the heat being utilized in establishing a hot zone around the screen. This hot zone does not, therefore, increase the efficiency of the process, for the reason that heat is effective in accomplishing an increase of efficiency only if it is applied to the mixture before contact takes place.

One of the objects of this invention, therefore, is to provide a process and apparatus for oxidizing ammonia, in which the heat liberated in the reaction is concentrated on the mixture before contact takes place.

In the operation of an apparatus for oxidizing ammonia, the catalyzer is subject to clogging, damage and the development of dead spots, which require inspection, cleaning, repair and replacement.

Another object of this invention, therefore, is to provide an apparatus whereby the catalyst may be readily inspected, cleaned, repaired and replaced without necessarily interrupting the operation of the process and apparatus.

Another object is to provide a process in which the mixture of the ammonia and air, as well as the preheating and the reaction, will be facilitated in order to improve the operation and increase the efficiency.

Another object is to provide an apparatus of the character described, whereby the thermal efficiency may be increased generally by the disposition of the parts in the preheating of the gases and the mixture of gases.

Another object is to provide an apparatus of the character described, which is simple in construction, effective and economical in its action, in which parts can be readily repaired and replaced with a minimum of interruption of the process, and which is economical to manufacture, install and maintain.

Further objects will appear from the detail description, taken in connection with the accompanying drawing, in which—

Generally stated and in accordance with this invention, the mixture to be contacted with a catalyzer is preheated in a chamber whose wall is heated by the catalyzer. While the mixture is, therefore, preheated by heat evolved at the catalyzer, it is not heated after such contact but, rather, is cooled immediately thereafter. This is accomplished by providing a wall, preferably of the heat reflecting type, adjacent and opposite the catalyzer while the mixture is admitted to the preheating chamber thus formed between the catalyzer and the wall, and preferably directed against the wall. On the opposite side of the catalyzer is a heat absorber, which is, however, utilized, in accordance with the illustrated embodiment of this invention, for preheating one or both of the gases. The wall opposite the catalyzer is arranged for removal and replacement, so that the catalyzer may be readily inspected, cleaned, repaired or replaced with a minimum of interruption of the process. Means is also provided for blocking the chamber so as to interrupt the supply of mixture thereto, and this is accomplished, in accordance with the illustrated embodiment, by arranging the wall so as to cover the mixture inlet passages. In the apparatus a series of chambers, each containing a catalyzer, is arranged around a conduit or casing; accordingly, the supply of mixture to any of the chambers can be interrupted and the chamber blocked off without interrupting the other chambers and the catalytic action therein. The heat exchanger is arranged along this conduit so as to be adjacent to the catalyzers between these chambers and the conduit, in order that the mixture, after passing the catalyzer, will immediately give up its heat to the heat exchanger and the gases passing therethrough.

The ammonia and air are mixed by causing the streams of these gases to be directed against each other before contact takes place, and this is followed by preheating before contact, as previously described. The air is preferably preheated in order that there may be no condensation of nitric acid, which may attack the tubes of the heat exchanger; however, this preheating can be eliminated if the metal of the tubes is chemically resistant or covered with a resistant coating, such as enamel.

Figure 1:
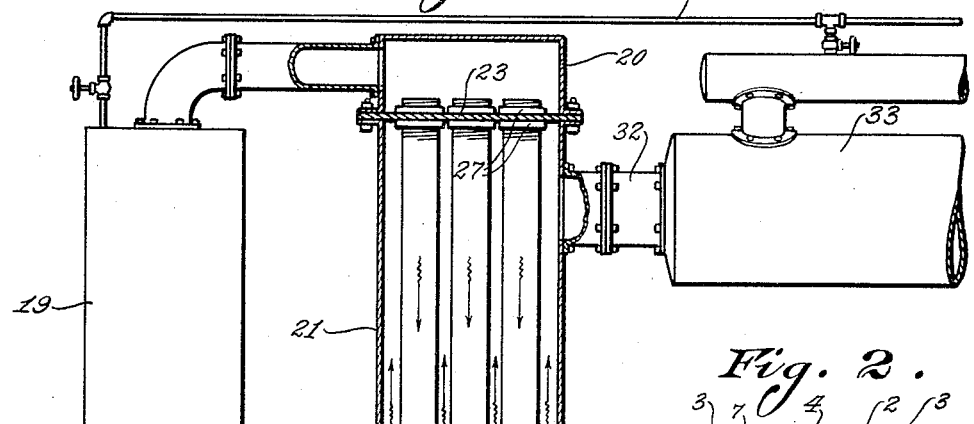
Figure 1 is an elevation partly in section of an apparatus embodying this invention and capable of carrying out the process embodying this invention.
Figure 2:
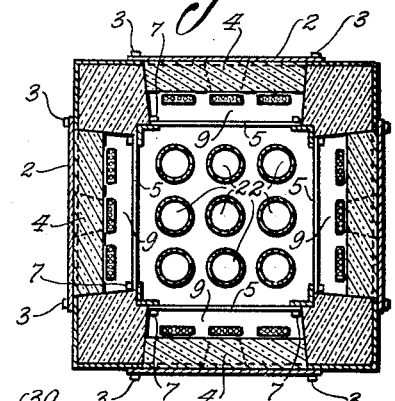
Figure 2 is a section on the line 2—2, Figure 1.
Figure 3:
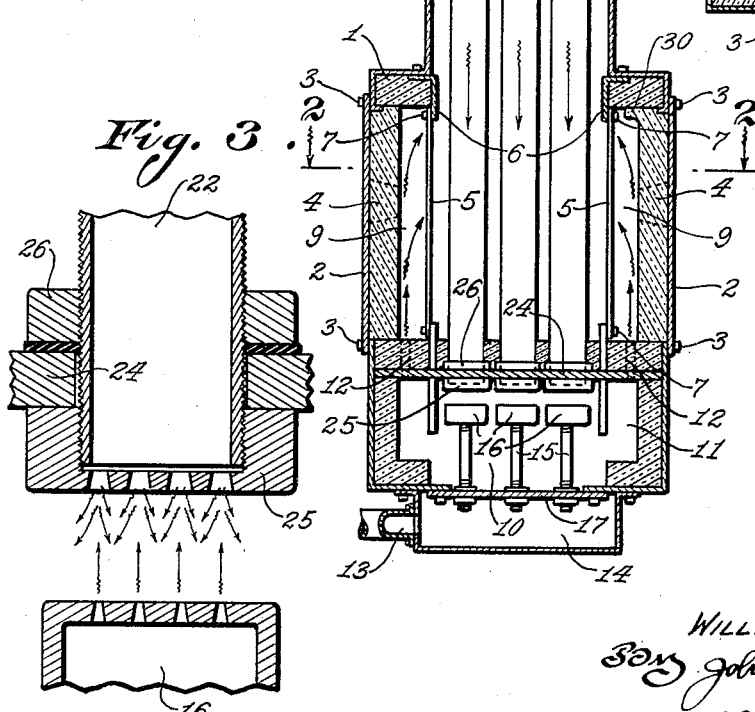
Figure 3 is an enlarged detail section of Figure 1, showing the arrangement for mixing the ammonia and air.
Figure 4:
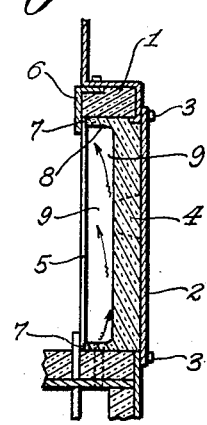
Figure 4 is a detail, illustrating another embodiment of this invention.

Referring now to the accompanying drawing, 1 designates a casing, which may be lined against chemical action as with a material such as enamel or glazed brick. Arranged around this casing is a series of openings, each closed by a door 2 attached by screws 3 or any other suitable fastening and provided with a peep hole 4. Also arranged within each opening is a screen 5 of platinum or an alloy of platinum or any other suitable catalyst. This screen is spaced from the inside wall of the door, and it may be attached either to a flange 6 on the casing by suitable screws or other fastenings 7, as shown in Figure 1, or it may be attached to the door itself, as shown in Figure 4, the door in the latter case being provided with a flange 8. There is thus formed between the door and the catalyst a chamber 9 whose function is that of a preheating chamber for the entering gases. The inside walls of this chamber, and more particularly the inside wall of the door, being adjacent the catalyst, will be heated thereby; and where the inside of the door is glazed, the heat will be reflected.

Arranged below the chambers 9 is a mixing chamber 10 having passages 11 leading from inlet ports 12 for the chambers 9. These ports 12 are of such area that the mixture will enter the chambers 9 at an increased velocity and in such a manner as to promote further mixing. The mixture is thus injected into the chambers, where it will be heated by radiation from and by striking the hot walls of the chamber before this mixture contacts with the catalyzer. If desired, and as shown in Figure 4, the ports may be inclined to definitely direct the mixture against the inside walls of the doors.

The ammonia is led by a pipe 13 from a suitable source of supply to a chest or header 14, with which connect pipes 15 each provided with a head 16 having nozzles. The heads 16 may be plated with any suitable plating, such as nickel or chromium, and each pipe 15 may be detachably mounted in a plate 17 bolted to the bottom of this mixing chamber. This facilitates ready removal and replacement of the parts.

An air pipe 18 leading from any suitable blower or source of supply preferably passes through a heater 19 of any suitable construction and into a header or chest 20 bolted to the top of a conduit 21. Arranged along this conduit is a series of pipes 22, which may be attached at the top to a plate 23 bolted between the header and the conduit, which latter is also bolted to the top of the casing 1. The bottoms of these pipes pass through a plate 24, preferably of aluminum. The bottom of each pipe is provided with a head 25 preferably plated with a suitable metal, such as nickel or chromium. Nuts 26 secure the pipes to the plate 24, while nuts 27 secure these pipes to the plate 23. The heads 25 are each perforated to provide nozzles; these nozzles are, however, of the expanding type, while the nozzles in the head 16 are of the contracting type, and these heads are opposed so that the air and ammonia are directed against each other to secure proper mixing.

As previously described, the doors 2 can be removed for inspection, cleaning, repair and replacement of the catalyzing screens 5. In order to block the chamber and interrupt the admission of the mixture to the chamber, any suitable means may be provided to effect that purpose. In Figure 1 the door has a ledge 30, so that upon removal and turning of the door through 180°, this ledge will cover the ports 12. In Figure 4, the same result can be secured by removal and turning the door through 180°. Accordingly, any catalyzer may be rendered ineffective with a minimum of interruption and particularly without interrupting the operation of the other catalyzers arranged around the casing or conduit. In view of the fact that the heat exchanger tubes are severally secured by nuts to the plates 23 and 24, any tube may be removed and its holes plugged without disturbing the operation of the other tubes.

It will, therefore, be seen that not only is a thorough mixture of the ammonia and air secured by the arrangement of the nozzles, but the mixture is effectively preheated before passing through the catalyzing screen. The heat is, in fact, concentrated in the mixing chambers 9, so that the heat of reaction can be effectively utilized to secure preheating of the mixture before contact takes place. It will be seen, however, that the catalyzing screens are arranged close to the heat exchanger tubes 22; accordingly, not only is further heating avoided after the mixture passes through the catalyzer, but this mixture is immediately cooled after contact and the heat therein utilized to effect the economy of the process. The gases, after passing through the heat exchanger, issue at 32, and the heat can be further extracted in any suitable apparatus, such as a boiler 33, the steam of which can be led by a pipe 34 to the air heater 19. The gases can then be further cooled down before going to the absorption towers.

It will be understood that the size of the preheating chambers and the arrangement of the walls should be such as to allow the mixture to remain in the chambers long enough to be heated to a temperature sufficient to secure the most economical oxidation after contact. It will be understood that the catalyst screen may be of any of a number of thicknesses in accordance with the usual practice. These screens are, however, preferably rectangular rather than square, so as to give the greatest mechanical strength. The length of the heat exchanger, its diameter and also the number of tubes, will depend upon the size of the oxidizer and the number of catalysts; however, the number of tubes should be as few as possible and their length such that the gases will be hot enough on entering the preheating chamber to allow them to be heated by contact with the walls and by radiation to the best oxidizing temperature. The apparatus as a whole is of such construction that it can be taken apart with ease and rapidly in case it is necessary to make repairs. It will be understood that the screens, doors, etc., can be kept ready made up for immediate replacement; in such a case, when a catalyzer screen is to be repaired or inspected, it can simply be replaced with another screen, particularly when the screen is attached to the door as in Figure 4; no special arrangements of closing the ports 12 need in that case be provided. Furthermore, the air and ammonia supplies may be cut off by any suitable valves. The arrangement of multiple compartments 9, arranged in multiple or parallel with mixture branches leading thereto and discharging into a conduit, is of great advantage in that it enables a single installation to have great capacity and at a reduced cost as compared to installations in which each installation has a single oxidizing compartment. It will be understood, of course, that the process may be carried on under any desired pressure and even under high pressures, as the apparatus is designed to operate under various pressures.

While illustrative embodiments of apparatus embodying this invention have been described, and while these apparatus are effective for performing the process embodying this invention, it is to be understood that both apparatus and process are susceptible of various embodiments. It will furthermore be understood that certain features, operations and sub-combinations are of utility and may be employed without reference to other features, operations and sub-combinations; that is contemplated by and is within the scope of the appended claims. It is, furthermore, to be understood that various changes may be made in details and operations within the scope of the appended claims without departing from the spirit of this invention. It is, therefore, to be understood that this invention is not to be limited to the specific details and operations shown and/or described.

Having thus described the invention, what is claimed is:

1. An apparatus for oxidizing ammonia, comprising, a preheating chamber having a wall, a catalyzer mounted on said wall and in spaced relation therewith, said wall being arranged for removal and means for conducting the ammonia mixture between said wall and said catalyzer.

2. An apparatus for oxidizing ammonia, comprising, a conduit, a series of individual chambers arranged around said conduit, a pervious catalyzer interposed between each chamber and the conduit and means for admitting mixture to each chamber.

3. An apparatus for oxidizing ammonia, comprising, a conduit, a series of chambers arranged around said conduit, a pervious catalyzer interposed between each chamber and the conduit, means for admitting mixture to each chamber and means for selectively interrupting the supply of mixture to any of said chambers.

4. An apparatus for oxidizing ammonia, comprising, a conduit, a series of chambers arranged around said conduit, a pervious catalyzer between each chamber and said conduit, means for admitting mixture to each chamber, and a heat exchanger in said conduit.

5. An apparatus for oxidizing ammonia, comprising, a conduit, a series of chambers arranged around said conduit, a catalyzer interposed between each chamber and the conduit and a pervious pipe passing through said conduit and discharging into said chambers.

6. An apparatus for oxidizing ammonia, comprising, a catalyzer having an active area of substantial extent, a body having a heat reflecting surface substantially close to the catalyzer and parallel therewith, and means for causing the mixture to be heated by said surface before reaching the catalyzer.

7. An apparatus for oxidizing ammonia, comprising, a catalyzer having an active area of substantial extent, a body having a heat reflecting surface substantially close to the catalyzer and parallel therewith, and means for directing the mixture between said catalyzer and said surface.

8. An apparatus for oxidizing ammonia, comprising, a catalyzer having an active area of substantial extent, a body having a heat reflecting surface substantially close to the catalyzer and parallel therewith, and means for directing the mixture against said surface before reaching the catalyzer.

9. An apparatus for oxidizing ammonia, comprising, a conduit, a series of chambers arranged around said conduit, a catalyzer between each chamber and said conduit, means for admitting mixture to each chamber, and means for selectively interrupting the supply of mixture to any chamber without interrupting the flow through said conduit.

10. A process of oxidizing ammonia in which the mixture of ammonia and air or oxygen is contacted with a catalyzer, comprising, preliminarily preheating an ingredient individually, mixing the air or oxygen and ammonia and finally preheating the mixture adjacent the catalyzer and directly therefrom.

11. An apparatus for oxidizing ammonia, comprising, a casing, a conduit in said casing for transmitting an ingredient of the mixture, a mixing chamber at the end of said conduit, a passage communicating said chamber with said casing having a preheating chamber provided with a heat reflecting wall, and a catalyzer adjacent said wall and across said passage.

12. A process of oxidizing ammonia in which the mixture is contacted with a catalyzer, characterized by the feature that the mixture is preheated by passage for a substantial distance between the catalyzer and a closely adjacent surface heated by radiation from the catalyzer.

13. A process of oxidizing ammonia in which the mixture is contacted with a catalyzer, characterized by the feature that the mixture is directed against and across a body heated by radiation from the catalyzer prior to such contact.

14. A process of oxidizing ammonia in which the mixture is contacted with a catalyzer, characterized by the feature that the mixture is preheated in a confined zone immediately adjacent the catalyzer by heat radiated from the catalyzer and is cooled immediately after such contact by incoming ingredients.

15. An apparatus for oxidizing ammonia, comprising, a catalyzer having an active area of substantial size and a preheating chamber having a heat reflecting wall closely adjacent the catalyzer and extending substantially parallel thereto, the distance between said wall and said catalyzer being substantially less than a transverse dimension of the catalyzer.

16. An apparatus for oxidizing ammonia, comprising, a catalyzer having an active area of substantial size, a preheating chamber having a substantially continuous heat reflecting wall closely adjacent and extending substantially parallel to the catalyzer and means for directing the mixture against said wall.

17. An apparatus for oxidizing ammonia, comprising, a pervious catalyzer, a preheating chamber having a wall spaced from said catalyzer at a distance substantially less than a transverse dimension of the catalyzer and arranged to be heated by radiation from the catalyzer and a heat absorber beyond the catalyzer and immediately adjacent thereto.

18. An apparatus for oxidizing ammonia, comprising, a catalyzer having an active area of substantial size, a preheating chamber having a wall closely adjacent and substantially coextensive with the catalyzer and in heat receiving relation therewith, and means for mounting said wall for removal.

19. A process of oxidizing ammonia in which ammonia and air are mixed and contacted with a catalyzer, characterized by the feature that the ammonia and air are mixed by axially directing diverging and converging streams thereof against each other before such contact.

20. An apparatus for oxidizing ammonia, comprising, a conduit, a pipe in said conduit for transmitting an ingredient of the mixture, a mixing chamber at the end of said pipe, a second conduit for delivering another ingredient to the mixing chamber, a passage communicating said chamber with said conduit, and a catalyzer in said passage.

In testimony whereof I affix my signature this 4th day of May, 1929.

WILLIAM E. WAGNER.

CERTIFICATE OF CORRECTION.

Patent No. 1,915,077.            June 20, 1933.

WILLIAM E. WAGNER.

It is hereby certified that error appears in the printed specification of the above numbered patent requiring correction as follows: Page 4, line 53, claim 5, strike out the word "pervious" and insert the same before "catalyzer" in line 51; and claim 11, lines 93, 93 and 94, and 97, for "casing" read "conduit", and lines 93 and 96, for "conduit" read "pipe"; and that the said Letters Patent should be read with these corrections therein that the same may conform to the record of the case in the Patent Office.

Signed and sealed this 15th day of August, A. D. 1933.

M. J. Moore.

(Seal)                    Acting Commissioner of Patents.